C. M. HAESKE.
GUARD FOR PAINTED ARTICLES.
APPLICATION FILED MAY 27, 1909.
945,161.
Patented Jan. 4, 1910.
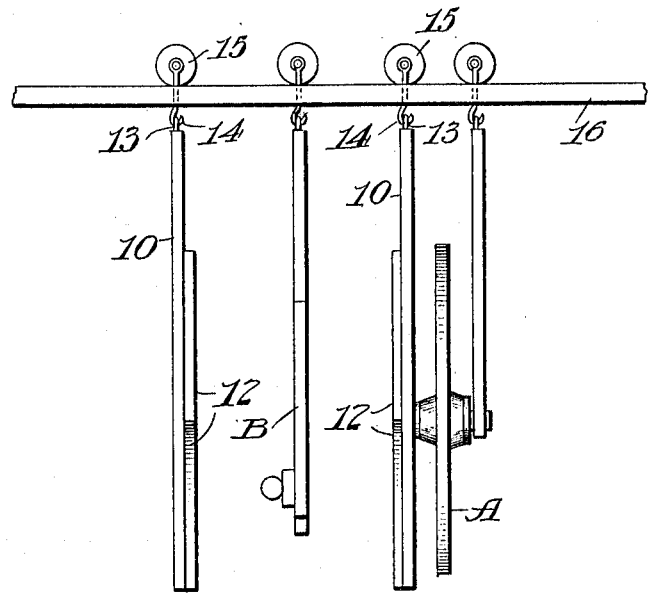
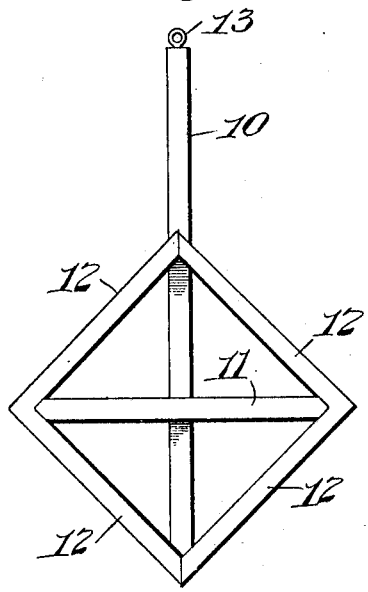
Witnesses
Inventor
Charles M. Haeske
By Jas. Du Shane
Attorney

UNITED STATES PATENT OFFICE.

CHARLES M. HAESKE, OF SOUTH BEND, INDIANA.

GUARD FOR PAINTED ARTICLES.

945,161. Specification of Letters Patent. Patented Jan. 4, 1910.

Application filed May 27, 1909. Serial No. 498,791.

*To all whom it may concern:*

Be it known that I, CHARLES M. HAESKE, citizen of the United States, residing at South Bend, in the county of St. Joseph and State of Indiana, have invented certain new and useful Improvements in Guards for Painted Articles, of which the following is a specification.

This invention relates to certain new and useful improvements in guards for painted articles.

In the manufacture of wagons and the like, it is the general practice in the painting of the various parts, to suspend said parts from an overhead track, and move them along through the processes of dipping, drying, striping and varnishing, without removing them from the rollers or trucks by which they are supported. The article is thus moved along until delivered in a finished state at the room for assembling or packing the vehicle. In the swinging and moving of the continuous line of these parts it frequently happens that they scratch or chafe each other, thus marring the finish, and necessitating the touching up of the scratched parts by hand.

The present invention has for its object to obviate this difficulty by providing a suitable spacing device to be interposed between two parts while they are being transported along the overhead track, whereby the suspension and the cross lines are protected, and injury to the parts being painted is prevented.

The invention will be hereinafter fully set forth and particularly pointed out in the claim.

In the accompanying drawing:—Figure 1 is a view illustrating an overhead track from which a number of wagon parts are suspended, with my improved guard interposed between them. Fig. 2 is a side elevation of the guard.

Referring to the drawing, 10 designates a vertical member provided near its lower end with a cross piece 11, suitable braces 12 being provided to hold said parts rigid. The upper end of said vertical member is provided with an eye 13 adapted to receive the depending hook 14 of a truck or roller 15 adapted to run upon an overhead track 16.

In the drawing I have illustrated the guard as interposed between a wheel A and the hounds B of a wagon, both of which are suspended from suitable trucks running on the track 16. The arrangement is such that the member 10 protects the suspension line of these articles, and the cross-piece 11 protects the horizontal line, and being made of a material that will not abrade the wagon parts they serve to prevent chafing, scratching or marring of the latter.

I claim as my invention:—

As an improved article of manufacture, a rigid separating device for wagon parts while being painted, consisting of a vertical member for protecting the suspension line of such parts, a cross member on said vertical member for protecting the horizontal line, the cross member extending at least to the outer edges of the article to be protected and inclined braces for said members.

In testimony whereof I affix my signature, in presence of two witnesses.

CHARLES M. HAESKE.

Witnesses:
A. E. DUSHANE,
J. DUSHANE.